Oct. 22, 1968   W. P. HILL   3,406,607
TOOL CHANGING AND FEED CONTROL MECHANISM
Filed Aug. 1, 1966   2 Sheets-Sheet 1
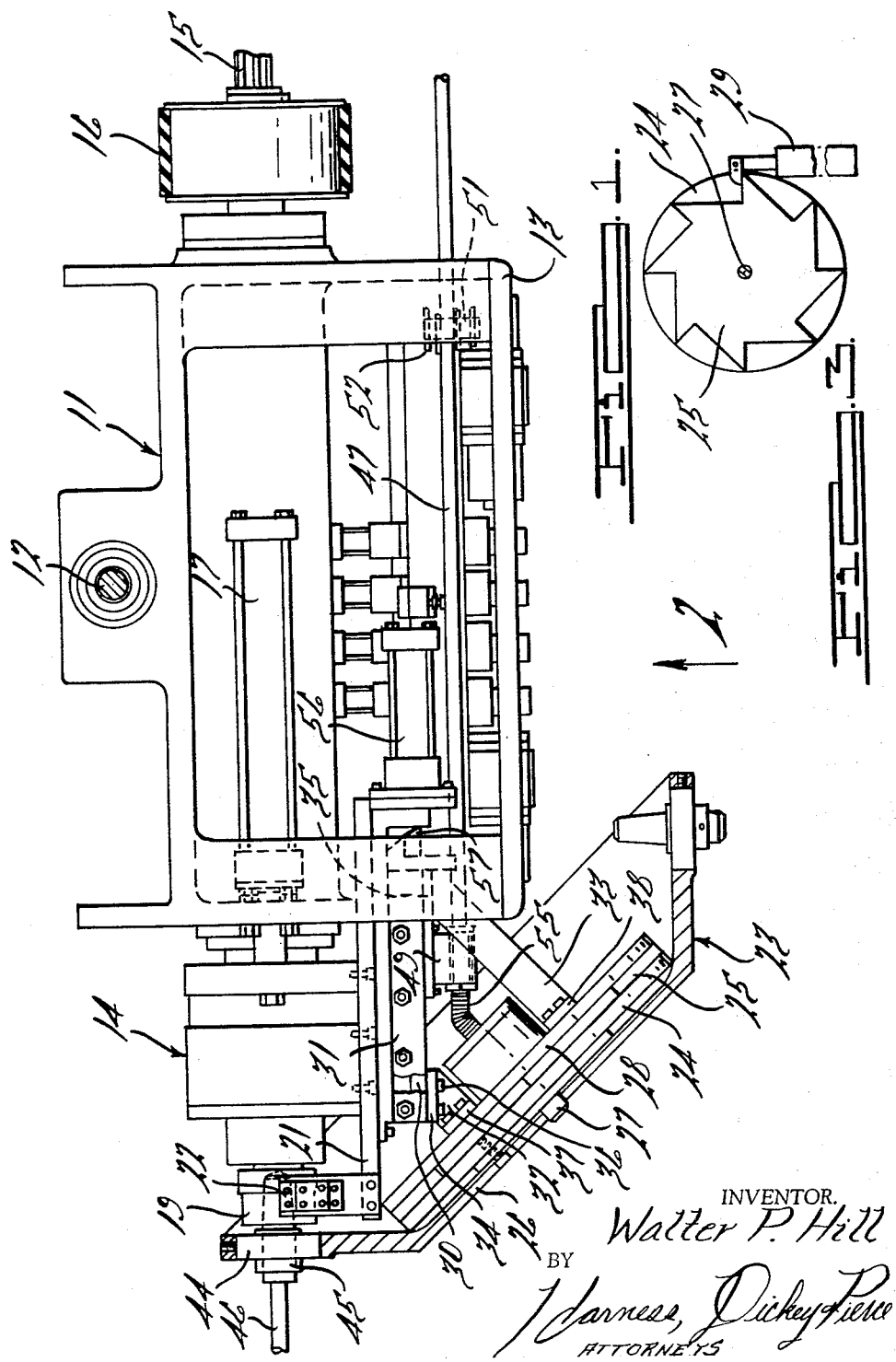
INVENTOR.
Walter P. Hill
BY
Harness, Dickey Pierce
ATTORNEYS

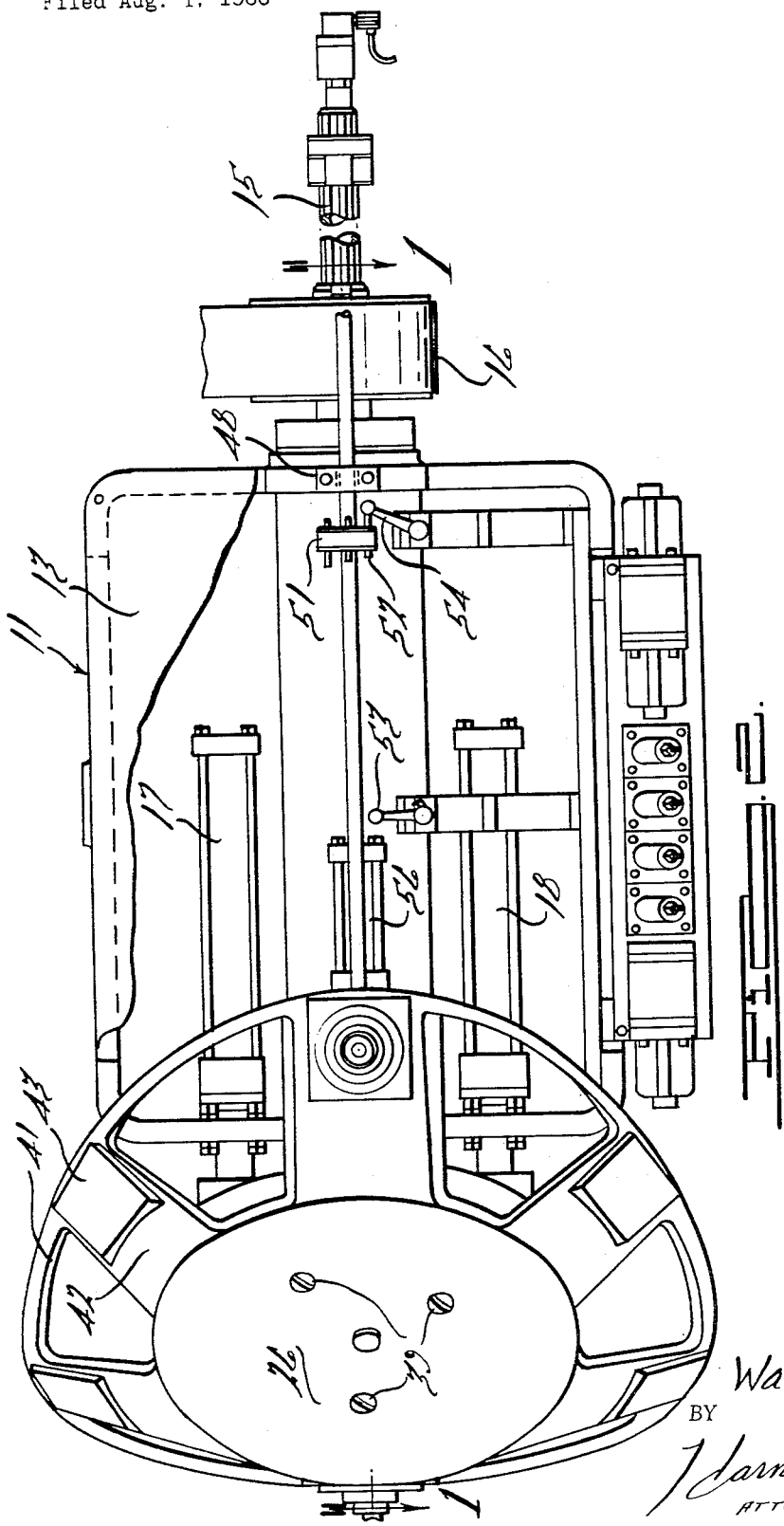

United States Patent Office 3,406,607
Patented Oct. 22, 1968

3,406,607
TOOL CHANGING AND FEED CONTROL MECHANISM
Walter P. Hill, Troy, Mich., assignor to Walter P. Hill, Inc., Oakland, Mich., a corporation of Michigan
Filed Aug. 1, 1966, Ser. No. 569,341
8 Claims. (Cl. 90—56)

This invention relates to tool changers, and more particularly to tool changing devices which can be mounted on numerically controlled machines such as boring mills, drills, milling machines or the like.

It is an object of the invention to provide a simple and economical tool changing device which can be readily mounted on conventional types of numerically controlled machines, thus enabling them to perform a succession of operations on a part using different tools, without the necessity of manual tool changing.

It is another object to provide an improved tool changer of this character by means of which tool changes can be made without stopping the machine.

It is a further object to provide a novel and improved tool changing device of this character which requires little modification of the conventional machines to adapt them for easy mounting and removal of the tool changer.

It is also an object to provide an improved tool changing device for numerically controlled machines which incorporates an automatic feed selector, whereby the indexing of each successive tool to its operating position will simultaneously set the feed depth control for that tool.

It is another object to provide an improved tool changing device of this nature in which the tool changer portion of the assembly may be quickly and easily removed while still permitting the feed depth selector to operate in the normal manner.

It is another object to provide an improved tool changing device of this character in which hollow tools can be used to coact with hollow spindles carrying coolant therein.

It is still another object of the invention to provide an improved tool changing device of this nature which is compact in size, reliable in use and requires little maintenance.

Other objects, features and advantages of the present invention will become apparent from the subsequent description and the appended claims, taken in conjunction with the accompanying drawings, in which:

FIGURE 1 is a top plan view of a portion of a numerically controlled boring mill, parts being broken away and in section along the line 1—1 of FIGURE 2, showing the tool changer of this invention mounted in position on the slide assembly, the latter being in its retracted position;

FIGURE 2 is a side elevational view of the assembly shown in FIGURE 1 taken in the direction of the arrow 2 of FIGURE 1, parts being broken away, and FIGURE 3 is a schematic view of the index plate and star wheel showing the coaction of the indexing motor therewith.

Briefly, the illustrated embodiment of the invention comprises an index plate which is rotatably and slidably mounted on the side of a conventional tape controlled boring mill or similar numerically controlled machine tool and which carries a tool holding dial capable of supporting a plurality of tools in circumferentially spaced relation. The axis of rotation of the index table and dial is at 45° to the tool spindle axis, while the path of sliding movement is parallel to the direction of feed, that is, parallel to the spindle axis. The outer portion of the dial is of frusto-conical shape so that when the dial is rotated the tools will be brought into successive alignment with a known type of quick-release tool holder carried by the spindle of the machine. A fluid operated motor carried by the slide is positioned adjacent the quick-release tool holder for actuation to its release position. A fluid operated motor is also mounted adjacent a star wheel attached to the index plate for rotating it to its successive positions. Another fluid operated reciprocating motor is carried by the slide of the machine and is connected to the index plate so that the index plate and tool holder dial may be moved forwardly with respect to the main slide of the machine each time it is desired to withdraw a tool from the tool holder and index the dial.

A feed depth selector shaft is slidably and rotatably carried by the head of the machine on an axis parallel to the spindle axis, and carries a holder for circumferentially spaced limit switch dogs, these dogs corresponding in number to the tools carried by the tool holder dial. The length of each of these dogs is chosen to correspond with the desired feed depth for the tool, and the shaft is connected to the index plate by a universal joint in the form of a spiral spring so that when the index plate rotates, the shaft will rotate a corresponding angular distance. This shaft will travel back and forth with the main slide of the machine, and the dogs will engage limit switches at the forward and rearward ends of their strokes, thus controlling the feed depths of the tools.

The tool holder dial is detachably secured to the index plate by a plurality of circumferentially spaced bolts. If it is desired to change tools manually, the dial may thus be quickly and easily removed, the feed depth selector mechanism still remaining intact so that it may be utilized for automatic tool feed selection.

Referring particularly to the drawings, the machine drill head is generally indicated at 11, this head being carried by vertical ways (not shown) and vertically adjustable by means of a lead screw 12. Head 11 has a cover 13 on one side thereof, a portion of this cover being removed in FIGURE 2 for purposes of clarity. A slide generally indicated at 14 is mounted for reciprocating movement on head 11. A spindle 15 is rotatably carried by slide 14 and extends through head 11, being driven by a timing belt 16. The means for reciprocating slide 14 comprises a pair of cylinders 17 and 18 within head 11 having piston rods which extend through the forward end of head 11 and are secured to slide 14. A tool holder 19 is mounted on the forward end of spindle 15. Tool holder 19 is of the type in which a tool may be mounted without first orienting the tool in an angular direction but by merely moving it axially therein. This tool holder is of a quick-release type which permits a tool to be secured therein by insertion of the tool and quickly released therefrom by a reciprocating member. One example of such a quick-release tool holder is the "Quik Switch" tool holder made by Universal Engineering Company of Frankenmuth, Mich. Spindle 15 is shown as being of a hollow type for the conduction of coolant to tool holder 19. Thus, hollow tools 46 may be used for the conduction of coolant. A mounting plate 21 is carried by slide 14 adjacent holder 19, and an air-operated cylinder and piston 22 is carried by this mounting plate for actuation of holder 19 to its releasing position.

The tool changer and feed selector subassembly is generally indicated at 23 and comprises an index plate 24 of circular shape, a star wheel 25 secured to one side of the index plate, and a tool holding dial 26 secured to the other side of the index plate. These three parts are mounted to a center post 27 so as to be rotatable in unison. Post 27 is rotatably supported by a circular base 28. A reciprocating motor and pawl 29 (seen schematically in FIGURE 3) is carried by base 28 and is adapted to index star wheel 25 the angular distance between adjacent teeth with each reciprocation.

Ways 30 are secured to one side of mounting plate 21 extending parallel to the spindle axis and these ways serve to slidably support subassembly 23. More particularly, an auxiliary slide 31 is mounted on ways 30 and a plurality of brackets 32 and 33 connect subassembly 23 to slide 31. Bracket 32 is relatively short and bracket 33 relatively long, as seen in FIGURE 1, and the opposite ends of each bracket have a pair of flanges in planes 45° from each other. Flanges 34 and 35 of brackets 32 and 33, respectively, are secured by bolts 36 to slide 31, while flanges 37 and 38 of brackets 32 and 33 are secured to base plate 28.

The result will be that the axis of post 27 will be at an angle of 45° to the spindle axis when subassembly 23 is in its mounted position.

Tool holding dial 26 is detachably secured to index plate 24 by a plurality of circumferentially spaced bolts 39. The outer portion of dial 26 is frusto-conical shape with a cone angle of 45°. This portion of the dial has spaced openings 41 between which are tool supporting portions 42 having flat pads 43 formed thereon (FIGURE 2). These flat pads carry bearings 44 which in turn carry tool adapters 45 for supporting various drills or other tools 46. The size and shape of dial 26 is such that when it is rotated by reciprocation of motor 29 successive tools 46, which are equidistantly angularly spaced around the dial, will be brought into alignment with the spindle axis. It should be noted that because of the frusto-conical shape of dial 26 it will not occupy much space when subassembly 23 is mounted on the machine; this is particularly evident in FIGURE 1.

A feed depth selector rod 47 is disposed within head 11 and extends outwardly from the opposite ends thereof. The rearward end of this rod is slidably and rotatably supported by a bearing 48 (FIGURE 2) carried by the rearward end of head 11, and the forward end of the rod is rotatably but nonslidably supported by a bearing 49 carried by slide 31. Rod 47 carries a limit switch dog holder 51 which is secured thereto within head 11. This holder carries a plurality of limit switch dogs 52 in circumferentially spaced relation. The number of these dogs is equal to the number of tools carried by dial 26, and the dogs are equidistantly angularly spaced. They are adapted to coact with a pair of limit switches 53 and 54 mounted within head 11, and are of various lengths depending upon the feed depth which is desired for each individual tool.

Means are provided for interconnecting post 27 with rod 47. This means comprises a universal joint in the form of a spiral spring 55, one end of which is secured to post 27 and the other end to rod 47 forwardly of bearing 49.

Means are also provided for reciprocating the tool changer and feed selector subassembly with respect to slide 14. As shown, this means is in the form of an air operated cylinder 56 having a piston 57 connected to auxiliary slide 31 (FIGURE 1). Cylinder 56 is secured to slide 14 adjacent the end of mounting plate 21, and is disposed within head 11.

In operation, starting from the position seen in FIGURES 1 and 2, and assuming tool 46 has just been mounted in tool holder 19, slide 14 will be advanced by cylinders 17 and 18 toward the work, with spindle 15 and tool 46 rotating. Subassembly 23 will be carried along with the slide until a dog 52 engages limit switch 53. This will cause the feed movement to be terminated by automatic means (not shown), and cylinders 17 and 18 will thereafter retract slide 14 together with subassembly 23. The retracting movement will continue until the other end of dog 52 engages limit switch 54. Automatic means (not shown) will then cause cylinder 22 to actuate tool holder 19 to its releasing position so that tool 46 will be released from the tool holder. Cylinder 56 will then advance subassembly 23 to the left in FIGURES 1 and 2 until tool 46 is clear of tool holder 19. Star wheel 25 will then be indexed by motor 29, index plate 24 and dial 26 being rotated until the next tool 46 is in alignment with tool holder 19. As index plate 24 and dial 26 rotate, rod 47 will also be rotated through universal joint 55 to bring the next dog 52 into alignment with limit switches 53 and 54. Cylinder 56 will then retract subassembly 23 until new tool 46 is locked in position in tool holder 19. The machine will then be ready for another advance of tool slide 14 toward the work.

When it is desired to change tools manually, tool holder dial 26 may be removed by unscrewing bolts 39. The feed depth selector portion of the mechanism will still remain intact and will operate in the manner described above, being indexed by cylinder 29 which will operate star wheel 25.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a tool changing and feed depth selector device for use with numerically controlled machine tools of the type having a tool slide movable toward and away from the work and spindle rotatably carried by said tool slide, a base, tool supporting means rotatably mounted on said base, a tool changer and feed selector subassembly comprising an auxiliary slide mounted on said tool slide for movement parallel to the spindle axis, means securing said base to said auxiliary slide, means for reciprocating said auxiliary slide with respect to said tool slide, a quick-release tool holder carried by said spindle, said tool holder having means whereby movement of said auxiliary slide in one direction will cause a tool carried by said tool supporting means and aligned with said tool holder to become connected thereto, and means mounted on said tool slide adjacent said tool holder for actuating the tool holder to its releasing position.

2. The combination according to claim 1, said rotatable tool supporting means comprising a tool holding dial having an outer portion of frusto-conical shape and a center post rotatably supported by said base and carrying said dial, said post being angularly related to the spindle axis.

3. The combination according to claim 2, the frusto-conical portion of said tool holder dial having open sections between which are disposed tool supporting sections, said tool supporting sections having flat pads formed thereon, and tool supporting bearings mounted in said pads.

4. The combination according to claim 1, further provided with a feed depth selector rod rotatably supported by said auxiliary slide parallel to said spindle axis, whereby said rod will travel with said tool slide and said assembly, means coupling said rod with said tool supporting means for rotation therewith, and a plurality of circumferentially spaced dogs carried by said rod, said dogs corresponding in number and angular spacing to the tools carried by said tool holding means and engageable with limit switches to limit the feed movement of said tool slide.

5. The combination according to claim 4, said coupling means comprising a universal joint in the form of a spiral spring connecting said tool supporting means and said rod.

6. The combination according to claim 4, said tool changer and feed selector subassembly comprising an index plate rotatably supported by said base, a star wheel secured to said index plate, and an index cylinder mounted on said base and having a pawl for indexing said star wheel.

7. The combination according to claim 1, said tool changer and feed selector subassembly comprising an index plate rotatably supported by said base, said tool supporting means comprising a tool holder dial secured to said plate by detachable fastening means, a star wheel secured to said index plate, and an index cylinder mounted on said base and having a pawl for indexing said star wheel.

8. The combination according to claim 1, said spindle being hollow for the conduction of coolant to said tool holder, the tool holder having means permitting connection of the tool thereto by insertion of the tool regardless of its angular position, whereby a hollow tool may be used for the conduction of coolant.

References Cited

UNITED STATES PATENTS

| | | | |
|---|---|---|---|
| 2,783,664 | 3/1957 | Johnson | 77—25 |
| 2,859,644 | 11/1958 | Watts | 77—25 |
| 2,870,659 | 1/1959 | Burg | 77—25 |
| 2,919,609 | 1/1960 | Klingbeil | 77—25 X |

WILLIAM W. DYER, JR., *Primary Examiner.*

G. WEIDENFELD, *Assistant Examiner.*